United States Patent [19]

Luk et al.

[11] Patent Number: 5,883,814
[45] Date of Patent: Mar. 16, 1999

[54] SYSTEM-ON-CHIP LAYOUT COMPILATION

[75] Inventors: Wing K. Luk, Chappaqua; Wei Hwang, Armonk, both of N.Y.; Yasunao Katayama, Kanagawa, Japan

[73] Assignee: International Business Machines Corporation, Armonk, N.Y.

[21] Appl. No.: 818,107

[22] Filed: Mar. 13, 1997

[51] Int. Cl.[6] ................................................... G06F 17/50
[52] U.S. Cl. ........................................... 364/491; 364/488
[58] Field of Search .................................... 364/488, 489, 364/490, 491, 578

[56] References Cited

U.S. PATENT DOCUMENTS

| | | | |
|---|---|---|---|
| 4,665,495 | 5/1987 | Thaden . | |
| 4,922,432 | 5/1990 | Kobayashi et al. | 364/490 |
| 5,148,524 | 9/1992 | Harlin et al. . | |
| 5,197,016 | 3/1993 | Sugimoto et al. | 364/490 |
| 5,222,030 | 6/1993 | Dangelo et al. | 364/489 |
| 5,285,919 | 2/1994 | Yamanouchi et al. . | |
| 5,291,580 | 3/1994 | Bowden, III et al. . | |
| 5,404,338 | 4/1995 | Murai et al. . | |
| 5,432,707 | 7/1995 | Leung . | |
| 5,541,850 | 7/1996 | Vander Zanden et al. | 364/491 |
| 5,557,531 | 9/1996 | Rostoker et al. | 364/489 |
| 5,598,344 | 1/1997 | Dangelo et al. | 364/489 |
| 5,598,348 | 1/1997 | Rusu et al. | 364/471 |
| 5,603,043 | 2/1997 | Taylor et al. | 395/800 |

OTHER PUBLICATIONS

Akira Yamazaki, et al., "A Cache DRAM for Graphic Application", Oct. 1993, Technical Report of IEICE, pp. 9–14.

*Primary Examiner*—Kevin J. Teska
*Assistant Examiner*—Leigh Marie Garbowski
*Attorney, Agent, or Firm*—Whitham, Curtis & Whitham; Robert P. Tassinari, Esq.

[57] ABSTRACT

A layout compiler compiles from hardware description language (HDL) and schematic description of a design, which consists of dynamic random access memory (DRAM) components and logic components, to the layout of an integrated logic and DRAM system on a single integrated chip. The layout compiler creates the physical structure (floor-plan) of integrated logic/DRAM chips and generates on-chip interconnections between the DRAM components and logic components. By integrating logic and DRAM memory onto the same chip, the performance gap which is the difference between the logic processor's data processing rate and the DRAM memory's data access rate can be minimized. Further, the bandwidth between the logic processor and the DRAM memory can be increased significantly. The layout methods eliminate the off-chip drivers and heavy capacitive loads presented in the off-chip interconnections. Low power dissipation is a direct result of integrated logic/DRAM chip in high frequency operations. This method enables the optimization of the on-chip metal interconnections between the logic components and the DRAM components in a way to achieve higher system bandwidth and system performance, lower power dissipation and packaging cost.

11 Claims, 11 Drawing Sheets

SYSTEM-ON-CHIP LAYOUT COMPILATION

BACKGROUND OF THE INVENTION

1. Field of the Invention

The present invention generally relates to single chip implementations of logic and memory components and, more particularly to a method for system-on-chip layout automation which translates (compiles) a hardware description language (HDL) of a design, consisting of logic components and memory components, into a layout on a silicon chip, with optimized floor plan, macro and layout structures of logic and dynamic random access memory (DRAM) circuits.

2. Background Description

The performance gap, which is the difference between the processor's computation rate (e.g., measured in MIPS or millions of instructions per second), and the memory's access data rate, exhibited in today's microprocessor and main memory, is becoming larger and larger for each new generation of chips. The bandwidth bottleneck between the graphics controller (processor) and frame buffer (memory) limit the performance of the conventional display subsystems.

The main reason of the above problems in systems with processor and dynamic random access memory (DRAM) is due to the fact that processor chips and memory chips are implemented in separate chips. There are other attempts to solve the problems, namely by using multi-layer ceramic module (MCM) technology or silicon on insulator (SOI) carrier technology to house the individual silicon chips together. But this still does not address the problem that the processors (logic) and the memory (DRAM) are implemented in different chips and, as a result, the limited bandwidth between the processor and the memory and the large capacitive loads presented In the off-chip interconnections are still limiting the overall system performance.

SUMMARY OF THE INVENTION

It is therefore an object of the present invention to provide a layout compiler to compile from hardware description language (HDL) and schematic description of a design, which consists of DRAM macros and logic macros (e.g., gate array, standard cell, custom design circuits, microprocessor, testing circuits), to the layout of an integrated logic and DRAM system on a single chip.

It is another object of the invention to provide a layout compiler to create the physical structure (floor-plan) of integrated logic/DRAM chips from the system/circuit schematic description.

It is a further object of the invention to provide a DRAM compiler/configurator, a key component in the compiler design system for integrated logic/DRAM chips, to create from basic DRAM building blocks, the physical structure, circuit, and layout of embedded, growable DRAM macros, with different amount of memory capacity, banking, and input/output (I/O) bandwidth, different addressing schemes, different mode of operations (e.g., asynchronous, synchronous, page, pipelining and interleaving), and timing requirements for a wide range of integrated logic/DRAM applications.

It is yet another object of the invention to provide layout methods which generate on-chip interconnections between the DRAM macros and logic macros to solve the bandwidth bottleneck problems in the prior art discrete, multi-chip implementations for processor and memory systems.

According to the invention, logic processor(s) and DRAM memory are integrated onto a single chip. This solves the processor/memory performance gap and bandwidth problems described above. By integrating logic and DRAM memory onto the same chip, the difference between the maximum data processing rate of the logic processor and maximum data access rate of the DRAM memory can be minimized. The disclosed layout methods eliminate the off-chip drivers and heavy capacitive loads presented in the off-chip interconnections in the prior art discrete, multi-chip implementations for processor and memory systems. The low power dissipation is a direct result of integrated logic/DRAM chip in high frequency operations.

The layout methods according to the invention eliminate the off-chip drivers and large capacitive loads between the processor and memory. As a result, the clock frequency of the integrated processor and memory chip can be further increased to improve system performance. The layout methods provide on-chip interconnections between the DRAM macros and logic macros which remove the pin density constraints in conventional DRAM packaging for processor and memory systems. In addition, the layout methods make the internal layout of the DRAM macro accessible for modification. As a result, the overall design of the processor and memory system can be further enhanced for performance and customized for specific applications. Further, the layout methods allow flexible addition of control logic macro/circuits to optimize the overall performance and operations of the integrated processor and memory chip layout.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
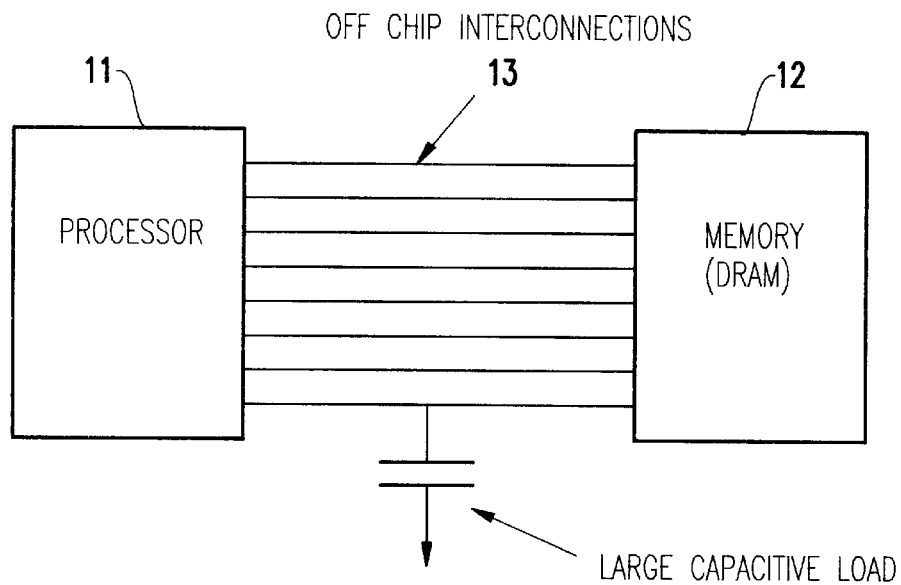
FIG. 1 is a block diagram of a conventional multi-chip processor memory system.

Referring now to the drawings, and more particularly to FIG. 1, there is shown a conventional multi-chip processor and memory system in which the processor 11 is connected to the memory 12, typically composed of DRAM chips, by means of off-chip interconnections 13 (e.g., a system bus). This system suffers the problems of limited bandwidth due to the off-chip interconnections and high power dissipation due to large capacitive loading.

Figure 2:
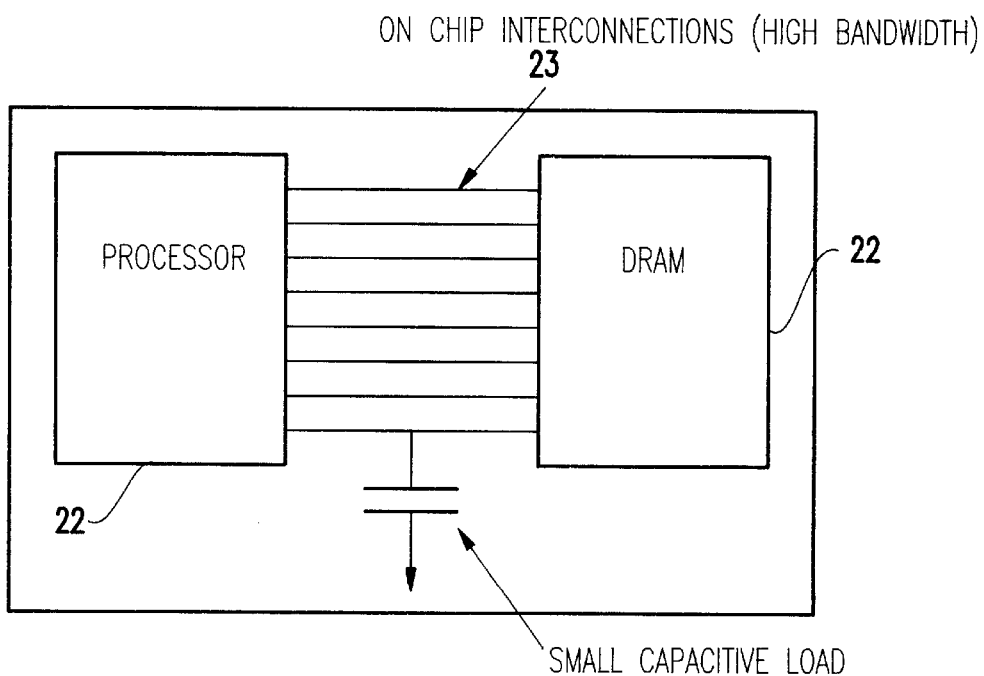
FIG. 2 is a block diagram of single processor memory chip with on-chip interconnections between the processor and memory.

FIG. 2 shows a single processor memory chip in which the processor 21 is connected to the DRAM 22 by means of on-chip interconnections 23. Due to the disappearance of off-chip interconnections as shown in FIG. 2, the bandwidth problems can be mostly eliminated since the amount of memory data transfer rate (bits per unit time) available to the processor can he made orders of magnitude higher by directly accessing the DRAM I/O and internal controls.

The power dissipation is high in the conventional multi-chip processor memory system due to the large capacitive loads presented in the off-chip interconnections as shown in FIG. 1, but by integrating the processor and DRAM on the same chip as shown in FIG. 2, the power dissipation can be much reduced since the length and the capacitive loads of the on-chip interconnections are much smaller, and can be further optimized by minimizing the wire length. As a result, the system clock rate can be further increased for better performance.

Figure 3:
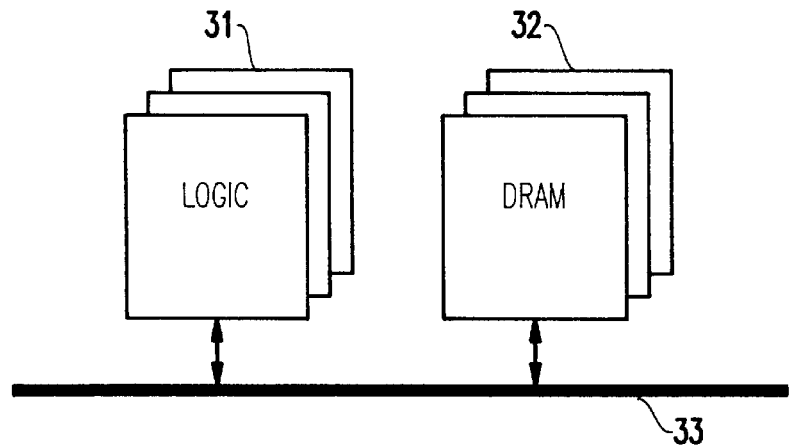
FIG. 3 is a block diagram of a conventional system with logic and DRAM chips connected to an external bus.
Figure 4A:
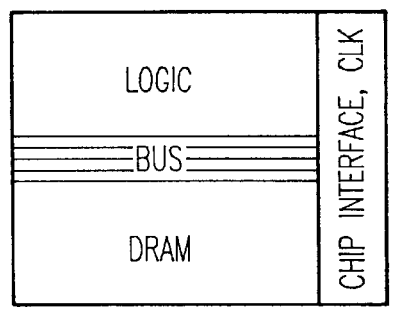
FIGS. 4A to 4D are block diagrams of various merged logic DRAM systems on a single chip.

FIG. 3 shows a conventional system with logic 31 and DRAM 32 in multiple chips connected to a common bus 33, such as a system bus. In contrast, the various forms (or chip floor plans) that DRAM chips and logic chips can be combined onto a single chip are shown in FIGS. 4A to 4D. FIG. 4A is the basic structure of putting DRAM and logic components onto a single chip. The logic portion includes one or more processors, a control unit, and various sub-systems such as graphic, digital signal processor, and the like. The DRAM portion implements memory/cache for the logic portions. The DRAM and logic portions are connected by high bandwidth, on-chip buses. Other components such as chip I/O interface and clock generation are also included.

Figure 4B:
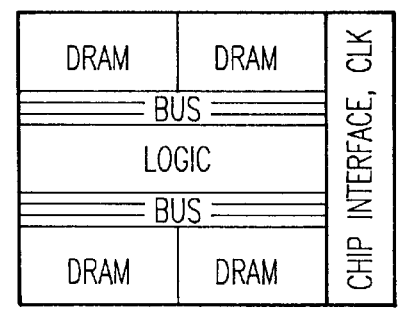
Figure 4C:
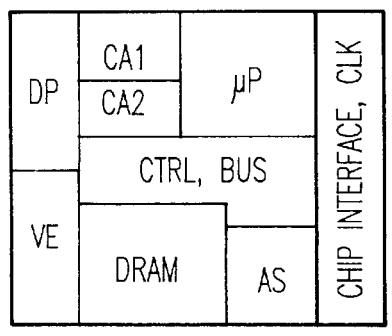
Figure 4D:
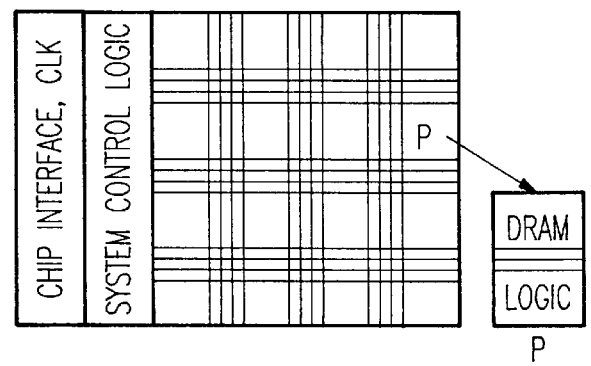

FIGS. 4B, 4C and 4D are different variants of the integrated DRAM/logic chips. FIG. 4B shows an integrated DRAM/logic chip with the DRAM being subdivided into a number of DRAM macros for a number of reasons; specifically, to satisfy and optimize for form factor, granularity, to increase the DRAM bandwidth, and so forth.

FIG. 4C shows an integrated computing system on a chip with a microprocessor ($\mu$P), two level of caches (CA1 and CA2), DRAM based memory, system and bus control unit, a digital processor (DP) and a video engine (VE) for multimedia application, an analog subsystem (AS) for communication and graphic applications, and the clock subsystem and chip I/O interface.

FIG. 4D shows an array of processing elements (P) each of which is made up of logic and DRAM elements for parallel processing applications, such as graphic, hardware simulation, and the like. Each processing element P is a local integrated logic/DRAM unit, and consists of a logic processor, a control unit, a local DRAM memory and local buses. The processing elements P are interconnected via two dimensional global buses. The system control unit acts as the overall system control for the chip.

Traditional memory design requires a time consuming process which requires many man-years of manual work in order to fully optimize the layout. This approach is very effective for large volume production. In recent years, there have been varieties of DRAM chips attempting to match the processor performance by creating new architectures such as wider I/O, synchronous interface, pipelining and interleaving, multi-bank architecture, among others.

Figure 5:
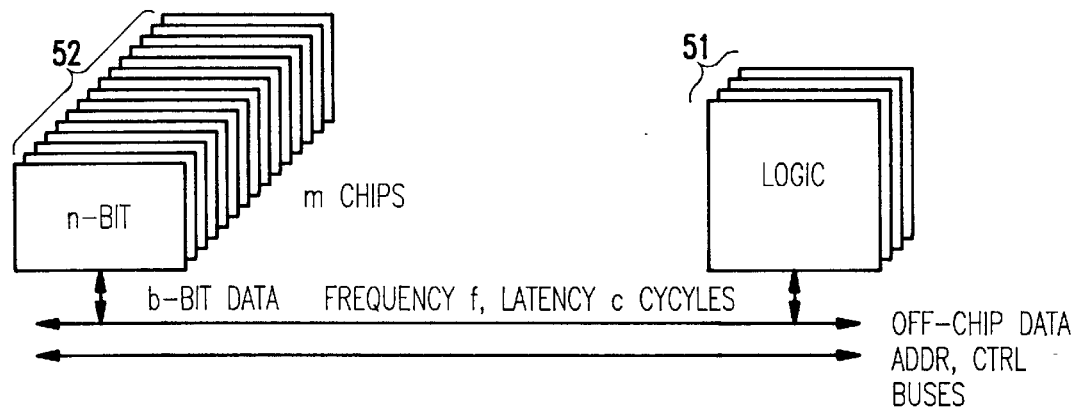
FIG. 5 is a block diagram showing a convention system of logic and DRAM chips connected to an external bus and illustrating the bandwidth problem of this system.

The methods described here allow the restructuring of the DRAM macro structure to meet the requirements of specific applications, since the internal structure and layout of the DRAM macros is made accessible on-chip, so the reconfiguration of the DRAM structure for performance and functional enhancement with the logic counterparts becomes feasible. FIG. 5 shows a system with discrete DRAM chips 52 and logic chips 53. In the illustrated example, there are m DRAM chips 52 and each chip has n bits, and the I/O of each DRAM chip is b-bits wide. Therefore, there are n×m bits of DRAM, and the system bandwidth is f×b, where f is the system clock frequency.

Figure 6:
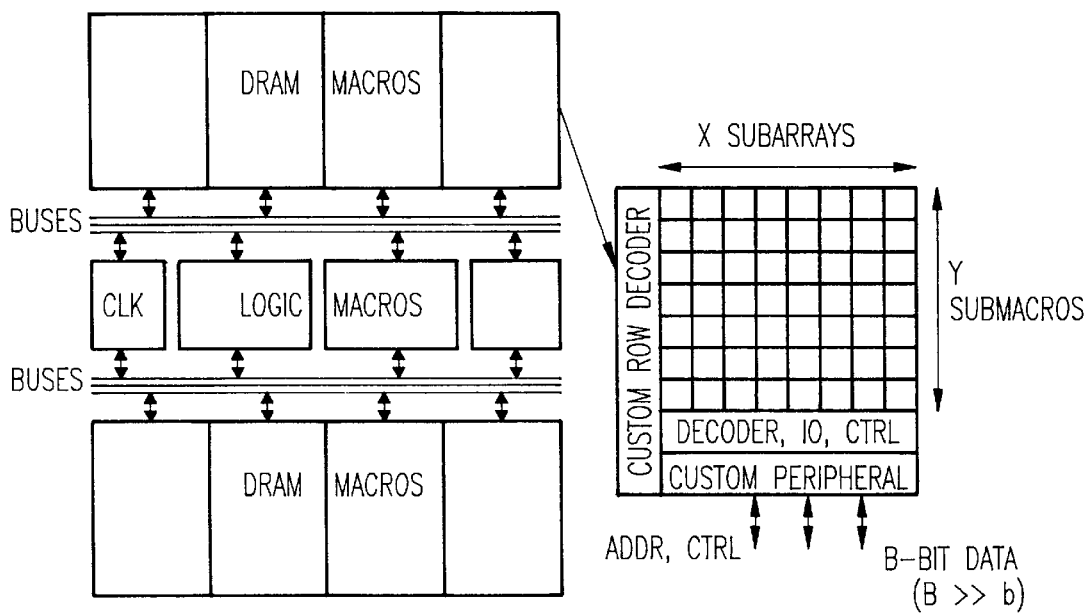
FIG. 6 is a block diagram of logic and DRAM on a single chip with DRAM customization.

FIG. 6 shows the different ways the DRAMs in the discrete case are integrated onto a single chip in the form of a number of DRAM macros. The on-chip DRAM macro configuration can be customized in terms of (1) the number M of on-chip DRAM macros, (2) the number Y of sub-DRAM macros in each DRAM macro, (3) the number X of basic DRAM building blocks (A) in each sub-DRAM macro, (4) the number B of I/O data-bits per macro, (5) the output driving power of the drivers in the DRAM macros to drive the external on-chip address, data, RAS, CAS, CE, etc., control buses as well as for the internal bit lines, word lines, and the like. The maximum number $B_{max}$ of I/O for a DRAM macro is given by $B_{max}=X\ I_{max}$, where $I_{max}$ is the maximum I/O the basic building block (A) can provide.

Assume there are M DRAM macros in an integrated DRAM/logic chip. The macros are divided into K groups (or banks), such that at any given cycle, M/K macros of a particular bank are active. The overall on-chip DRAM I/O width is BM/K bits, which is much larger than the b bits in the discrete case. If the integrated DRAM/logic chip runs at clock frequency F, the bandwidth of the DRAM/logic data bus is FBM/K bits/s. Since F is in general larger (faster) than f (the bus clock frequency of the discrete mutli-chip configuration), and the DRAM I/O width B for the integrated case is larger than b for the discrete case, so the overall data bus bandwidth for the integrate case is FBM/K bits/s which is much larger than fb bits/s for the discrete case.

Figure 7:
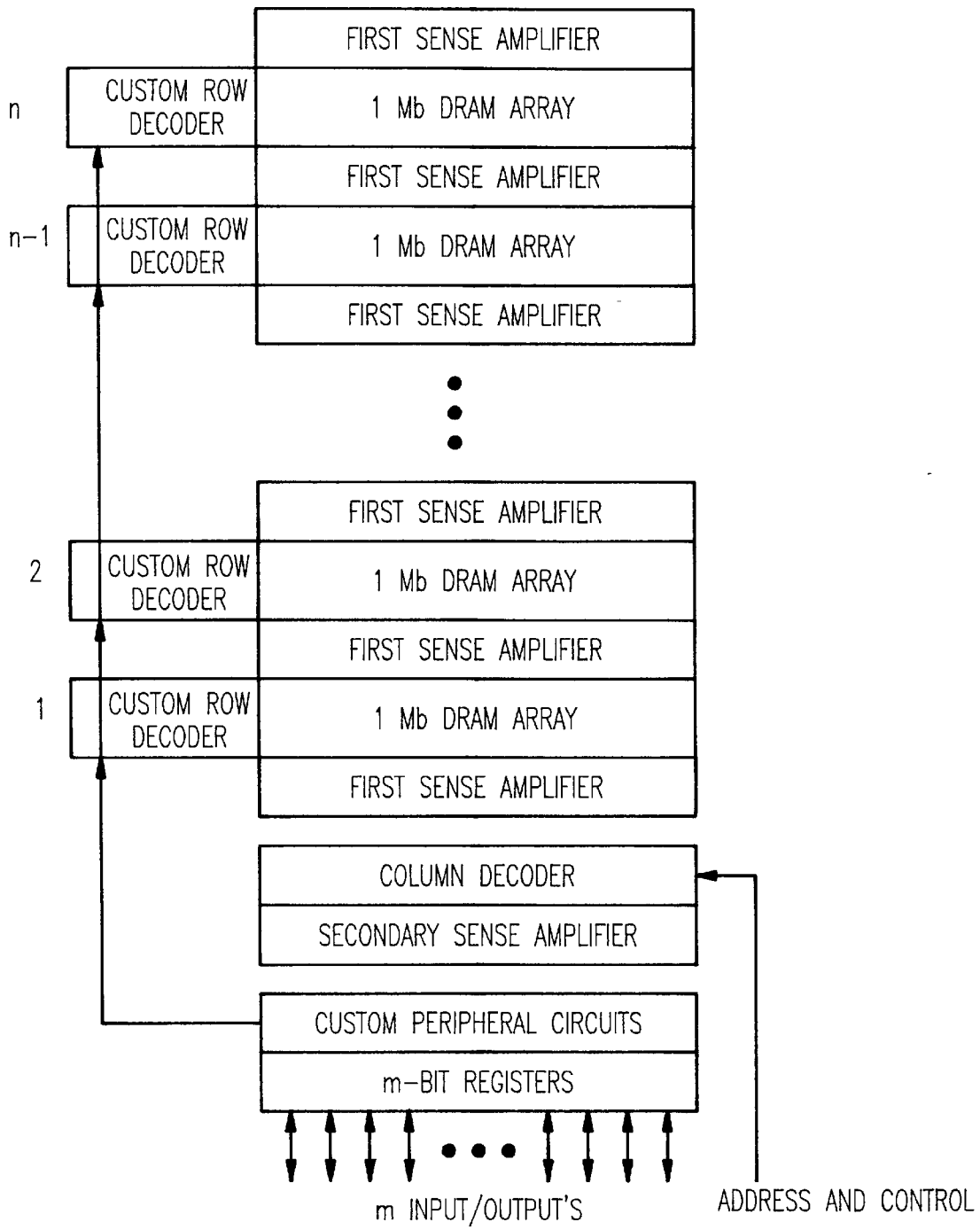
FIG. 7 is a block diagram illustrating a two-dimensional growable DRAM macro with n megabit arrays and m-bit I/O paths.

FIG. 7 shows the block diagram of a two-dimensional growable, flexible DRAM macro of variable capacity (X, Y, a-bit) and variable I/O width (B bits), where a is the number of bits in the basic building block A. The variable capacity of the DRAM macro is enabled by customizing the row decoders and the address lines in the DRAM macro, e.g., 1 Mb, 2 Mb, 3 Mb, . . . , 16 Mb. This is not possible when DRAMs were implemented as discrete chips. By configuring in the sub-arrays of each DRAM sub-macro, the sense amplifiers, the column decoding logic, the I/O connections in the peripheral circuits (located in the lower part of the DRAM macro shown in FIG. 7), DRAM macros with variable I/O widths (B-bit) can be generated, e.g., X1, X4, X8, X16, etc. As the x and y dimensions of the DRAM macro are changed, the drivers for the bit lines, word lines are adjusted accordingly for the changes in loading resistance and capacitance. The driver power of the output drivers in the DRAM macros are programmed to drive the external on-chip address, data, RAS, CAS, CE, etc., control buses as the resistance and capacitance of the loadings are changed.

The address lines of the on-line DRAM macros can be accessed from the custom row decoders directly in parallel, instead of multiplexed in the case of discrete DRAM due to address I/O pin count constraints. As a result, the on-chip DRAM has an advantage of smaller address setup time compared to the discrete, multi-chip DRAM/logic configuration.

By adding pipeline registers in the custom peripheral portion of an on-chip DRAM macro (see FIG. 7), the read/write access time of a conventional discrete DRAM can be divided into a few smaller time steps, operated at "synchronous" mode. Hence an on-chip DRAM macro can operate at a clock frequency a few times faster, and data can be read or written between the logic and DRAM at a much higher rate. The ratio of read/write access time to the synchronous, pipeline cycle time is a design parameter of the chip architecture for the DRAM macro.

The methods described here allow the modification of the interface between the processor/logic and DRAM in a way to match the DRAM macros' specific requirement, such as the ADDR, RAS and CAS timing, the timing of the DRAM control signals (WE, CE), the clock frequency. The different DRAM mode of operations such as synchronous, asynchronous, page mode, and the like, can be incorporated into the overall chip architecture by designing the logic/DRAM interface circuits. As a result, the overall performance between the logic and DRAM can be further enhanced.

The methods described here integrate the logic macros and DRAM macros onto the same chips and optimizes for their combined operations and overall performance, since the logic and DRAM components are accessible in the integration process.

The methods described here address the noise problem related to the integration of logic macros and DRAM macros onto the same silicon chip. When DRAM and logic are placed on different chips, the dI/dt switching noises due to the logic circuits are isolated from the DRAM cells and sense amplifier. When logic macros and DRAM macros are placed on the same chip, the switching noises from the logic circuits can propagate/couple through the power supply buses to affect the proper operations of the DRAM circuits, due to the voltage degradation of the DRAM voltage supply. Special structure of decoupling capacitance and routing of the power buses are described (hereinafter with reference to FIG. 11 and FIG. 14) to isolate the noise coupling between the logic and DRAM circuits.

Figure 8:
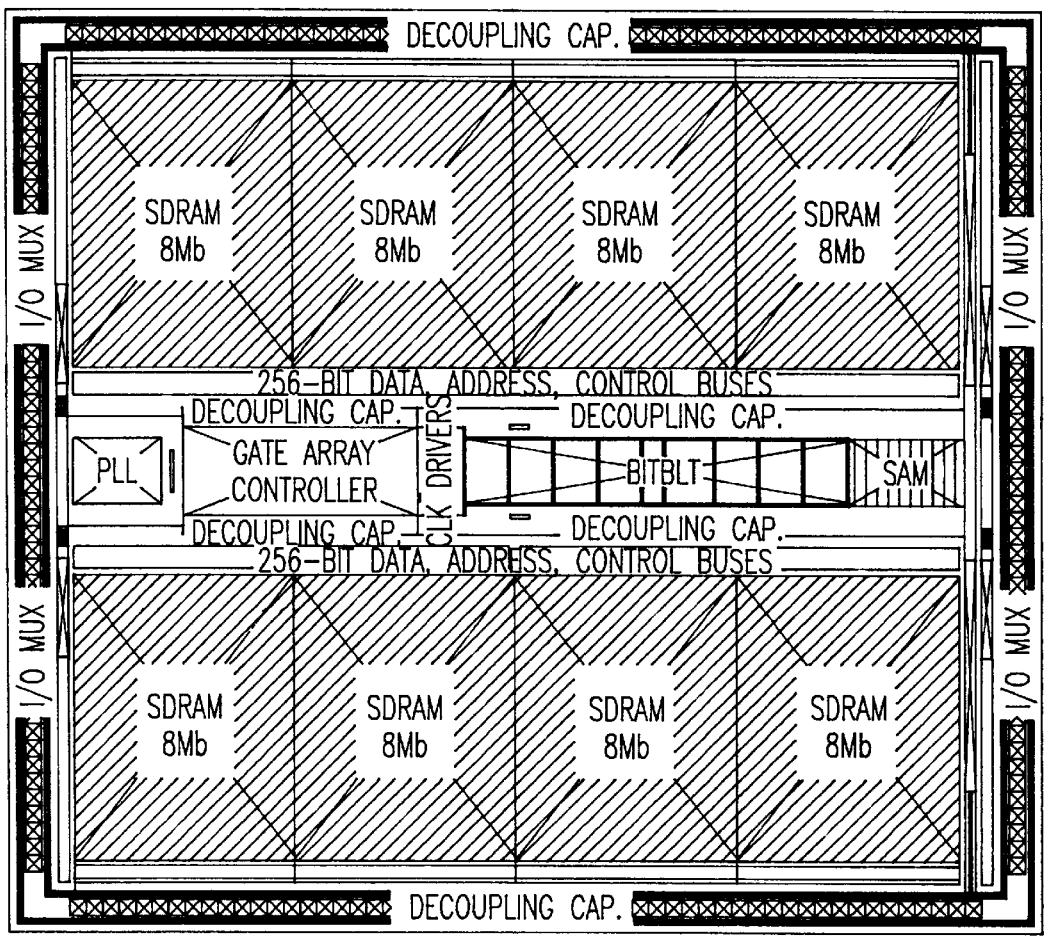
FIG. 8 is a chip layout structure of an integrated logic/DRAM chip incorporating DRAM macros and gate array logic, custom macros, phase locked loop (PLL), and chip I/O drivers.

FIG. 8 shows the chip layout structure of an integrated logic/DRAM chip made up of four DRAM macros (e.g., 4–6 Mbit), gate array logic macro custom macros, other supporting macros such as phase locked loop, and chip I/O drivers for low power, video display applications. The DRAM macros act as the frame buffer as found in discrete multi-chip implementation.

Figure 9:
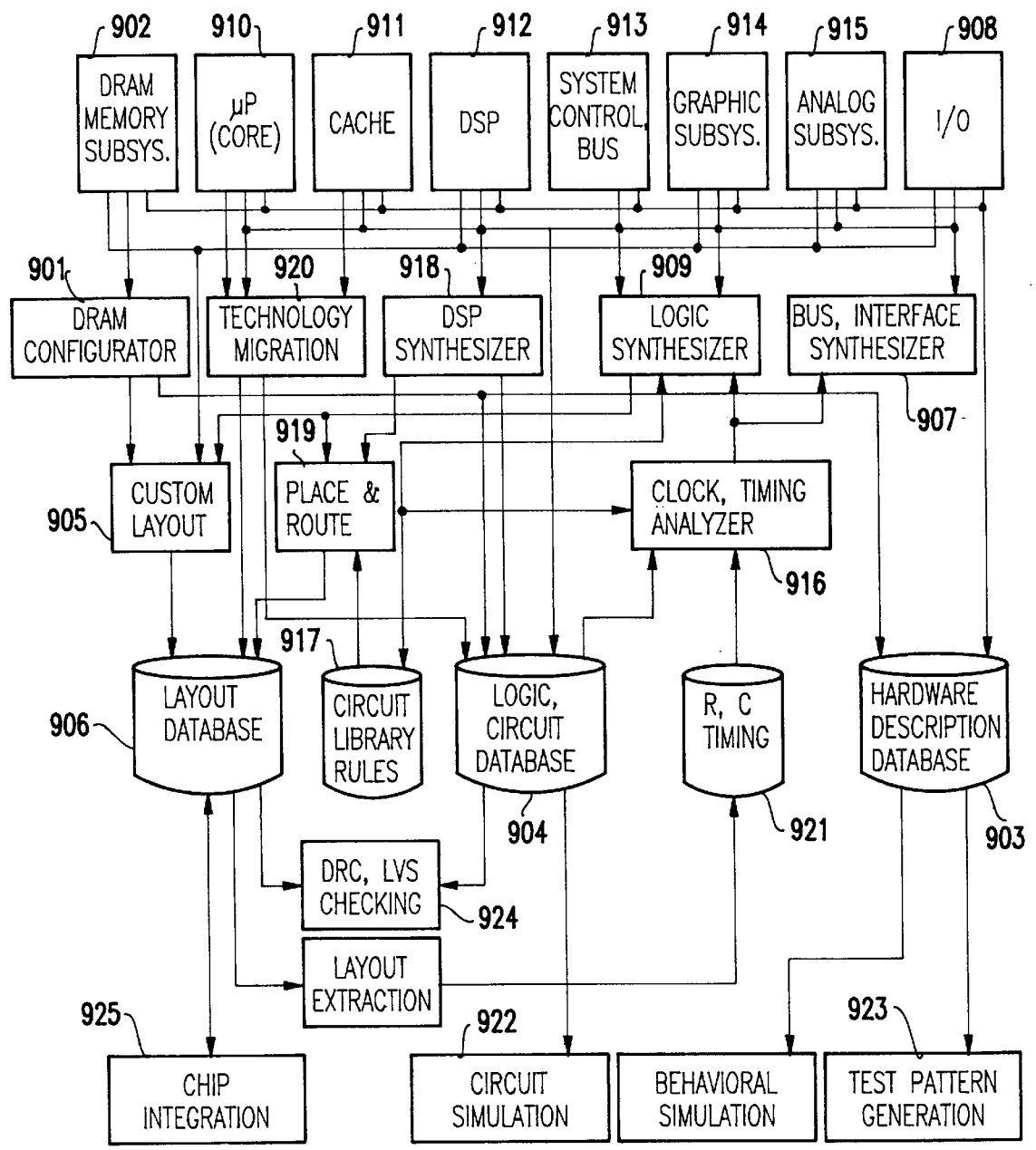
FIG. 9 is a block diagram of the system-on-chip design system and compilation according to the invention.

FIG. 9 illustrates the method and system for system-on-chip layout compilation according to the invention. Starting from a hardware description language (HDL) of a chip design which consists of memory components and logic components, through a sequence of computer-aided design (CAD) steps, the HDL can be "compiled" into chip floor plan, macro layouts, and then finally into the complete layout of a chip.

The HDL and schematic of a design which consists of control macros, processor macros, DRAM macros, chip I/O, clock macro, and various analog, graphic, digital signal processing subsystems, are compiled into the layout of a single chip. While processors and DRAM are conventionally manufactured in separately chips, the present invention describes the general physical structure (floor-plan) of the combined logic/DRAM chip. The method according to the invention generates the physical structures of the DRAM macros and the logic macros and generates and optimizes the low capacitance, on-chip interconnection between the different DRAM macros and logic macros for low power dissipation and small cycle time. The method according to the invention also generates the overall chip layout for the integrated logic/DRAM chip.

Conventional design systems mainly deal with the issues of putting processor and logic in one chip and DRAM in another single chip and do not address the issues of combined logic and DRAM macros on a single chip as described here. DRAM chip layouts have been done mainly manually to achieve high density and high yield for high volume DRAM production. The present invention is a sequence of computer-aided design steps to configure the physical structure, such as the memory capacity, width of I/O, access time, R/W mode, of DRAM macros according to requirements for the integrated logic/DRAM chips. The method will also create the structure/layout of logic macros that function with DRAM macros on a single chip.

The method also generates, from a hardware description of a design, an overall physical structure (floor plan) of the integrated logic/DRAM chip; including the individual DRAM macros, and the individual logic macros. The method also assembles the various DRAM and logic macros to form the final layout of the integrated logic/dram chip.

The integrated system on a chip consists of a number of functionally distinct entities (or macros) as described earlier. Some of the entities such as microprocessor, graphic/video controller, digital signal processor have well defined, well specified internal basic cores which will not be modified at the time of design integration to form the more complex chip.

As shown in FIG. 9, the DRAM configurator/compiler 901 receives input from the DRAM memory subsystem specification 902 and generates the overall circuits and layout of DRAM macros, by configuring the DRAM sub-macros and subarrays, address row and column decoders, peripheral timing and I/O circuits based on the primitive DRAM array, sense amplifiers, decoders, and so forth, as described earlier to satisfy the functional and timing requirements for the integrated DRAM and logic system, the DRAM macro capacity and the corresponding address lines, the synchronous pipeline clock rate, the I/O width, and so forth. The output of the DRAM configurator 901 is supplied to three databases; the hardware description database 903, the logic and circuit database 904, and, via custom layout function 905, the layout database 906. Since the DRAM macros are not optimized as in the case of discrete DRAM as a single unique design, modular and parametric techniques are used to specify and create the circuits and layout for the DRAM macros in order to meet the timing and functional requirements for a range of integrated DRAM/logic applications as demanded.

The bus and interface synthesizer 907 receives input from I/O specification 908 and synthesizes the logic related to the system buses and the logic necessary to connect ("glue" together) the various logic and DRAM macros on the chip. In addition to the signal connectivity information between the macros as described in HDL, the logic polarity, timing information and input/output loading between the various macros, capacitance loading and RC delay timing requirement of the buses are inputs to the synthesizer. The synthesizer synthesizes the buffers, drivers and latches according to the input requirements for the function of the chip.

The output of bus and interface synthesizer 907 is input to logic synthesizer 909 which, in addition, receives inputs from microprocessor core specification 910, cache specification 911, digital signal processor (DSP) specification 912, system control and bus specification 913, graphic subsystem specification 914, and analog subsystem specification 915. As shown in FIG. 9, for the overall system control and the control logic for the various subsystems (graphic, digital signal processor, analog, etc.), their corresponding logic circuit descriptions are generated by means of the logic synthesizer 909. The inputs to the logic synthesizer are the HDL descriptions, the timing specifications from clock and timing analyzer 916, the underlying circuit libraries from circuit library and rules database 917 from which the control circuits are built. The outputs of the logic synthesizer 909 are the logic circuits (logic gates) and are stored in the logic circuit database 904. The logic circuits (gates) of the various control logic macros are then placed and routed to form the layout.

The digital signal processor (DSP) synthesizer 918 generates the data path circuits for the DSP which are stored in the logic circuit database 904. The data path circuits are computational elements such as adders, multipliers, shifters, digital filters, and the like. The control logic of the DSP is synthesized using logic synthesis. The data path circuits are then placed and routed using special purpose data path place-and-route tools 919.

The graphic subsystem specification 914 mainly consists of control logic, custom logic, processor and static RAM (SRAM). The control logic is synthesized. The custom logic are custom designed by custom layout 905, and if needed, some circuit parameters, such as device width, are tuned for performance. The layouts are done by computer assisted custom layout tools. The graphic processor and special purpose SRAM are custom designed, or customized, converted from existing designs such as graphic processor core, growable SRAMs, and the like.

For some functional units such as microprocessor, SRAM caches, special purpose computing cores already exist in a different technology, in HDL, logic and layout forms and can be transformed into the technology of the current design in technology migration function 920 and then imported into the current design. Most layers of the previous layout can be mapped to the corresponding layers in the current technology. In addition, the shapes in the layout are modified to satisfy the current layout design rules. Those which have no direct mapping correspondence have to undergo special transformations, such as using different metal layers and vias. The transistor device channel length are sized to the current technology, the wiring size and grid are mapped accordingly. The parasitic, timing characteristic of the devices in the new layout have to be regenerated and the layout and logic/circuit database have to be updated.

The timing analyzer 916 analyzes the timing of all the signals of the overall chip. It locates the slowest signals from chip inputs to latches, between latches, and from latch outputs to chip outputs. It also locates the fastest signals that may arrive at latches too early. It then compare these signal timing with the timing requirements at the latches and chip I/O. Slack is the difference between the signal arrival time and its expected required time in order to meet cycle time requirement. The worst slack is the minimum of all skew. It is an indicator of how far off a given design in meeting the overall timing requirement. The timing analyzer 916 analyzes the timing at the gate or transistor level, including the delay in the devices and the RC delay of the wiring to compute the overall signal delay, signal rise and fall time. The resistance, capacitance and RC delay information are stored in the RC timing database 921. They are obtained and computed from the extracted layout. The clock analyzer 916 does similar analysis for the clock signals. It analyzes the timing of the clock signals at all the latches, including clock wire delay and skew. The results of the timing analyzers are stored in the design database and are used as design parameters to optimize the logic and physical design at various stages.

I/O, analog macros and some custom circuits in the various macros will require computer assisted custom layout to meet the special requirements of analog elements, layout ground rules, noise decoupling, timing, area, and the like.

Circuit simulation 922 based on the gates and transistors, and behavioral simulation of the HDL description are performed and cross referenced to check the correctness of the logic design.

Test patterns 923 are generated also from the HDL database 903 used for input/output patterns for the logic and behavioral simulation and hardware testing. Specific test patterns for the DRAM macros are also generated, as part of the DRAM configurator 901 and the chip compilation process, for logic simulation and testing of the DRAM functions. Self-testing of the DRAM macros can be implemented in logic circuits inside the chip to facilitate the hardware testing of the integrated DRAM/logic chips.

A Boolean equivalence tool which does not require input patterns to the design is also used to check the equivalence between logic description (gate and transistor) and the HDL.

The correctness of the layout is checked in checking function 924 by comparing the extracted device net list from the layout against the logic gate and transistor net list description. The entire layout is also checked for design rule violations by the design rule checker (DRC) tool.

The chip integration tool 925 assembles all the individual components (various macros, I/O, data and power buses, etc.) of the chips, and wired them according to the chip level schematic and HDL specifications. For integrated DRAM/logic chips, as compared to chips without DRAM, additional steps are taken (1) by adding decoupling devices along the DRAM and logic power supply buses, (2) by isolating the noise coupling between the DRAM macros and the logic macros, and (3) by isolating the DRAM circuits from the switching noises created by some logic macros (e.g., data paths) through the power supply buses, by partitioning the power supplies of the DRAM and logic so that their power supply buses are not shared within the internal of the chip, but are accessible through some specific points at the chip boundary.

The methods disclosed describe a sequence of steps to compile the schematic description of a design which consists of DRAM macros, and logic macros (either synthesized random logic or custom core), plus some supporting macros into the layout of a chip.

Figure 10:
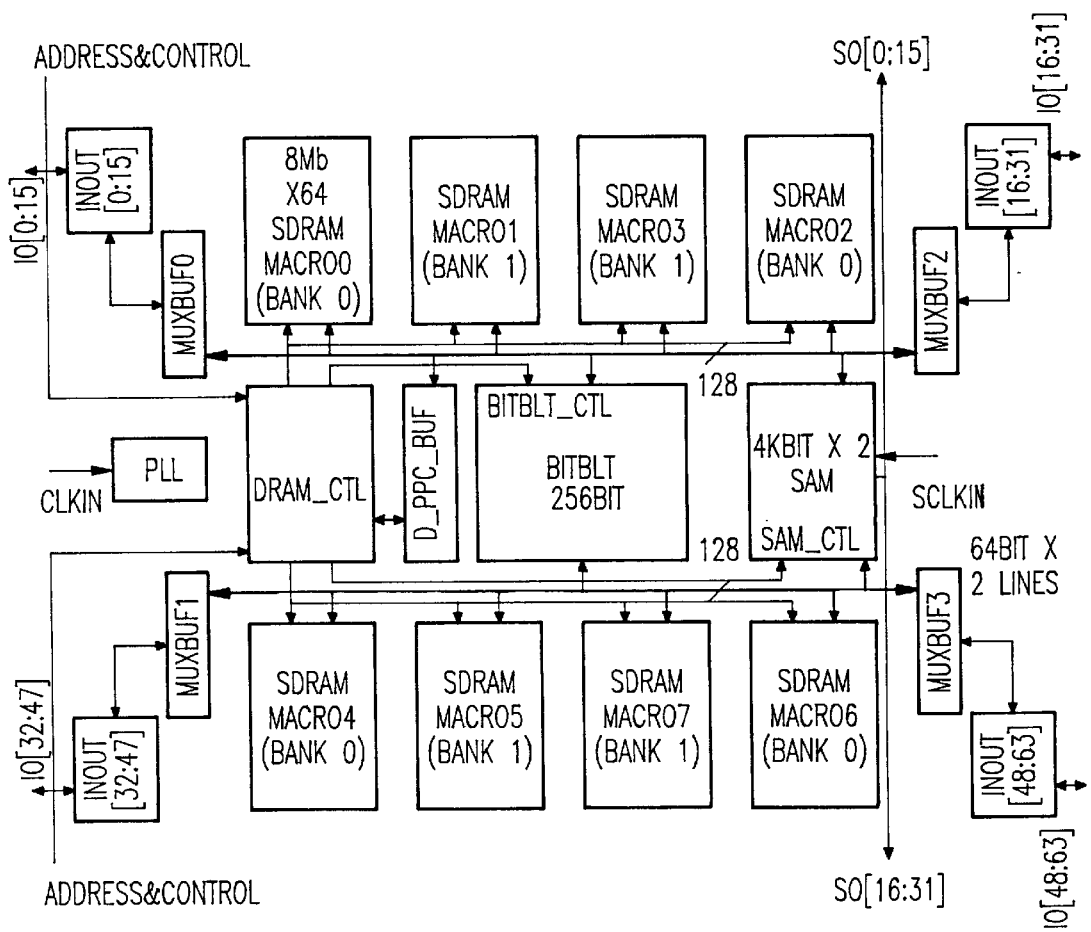
FIG. 10 is a block diagram of a Unified Media Memory (UMM) implemented using the invention.
Figure 11:
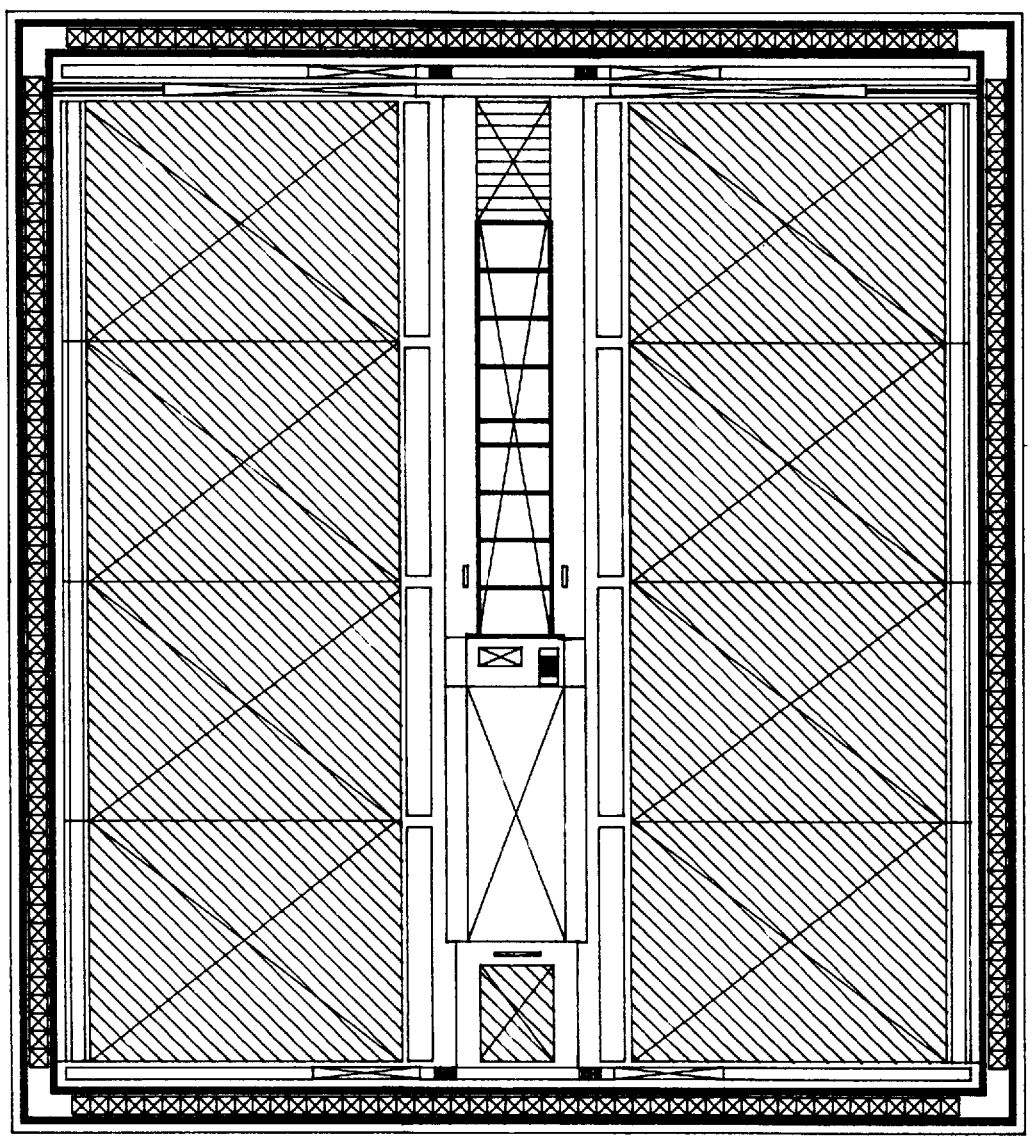
FIG. 11 is the UMM chip floor plan.

FIG. 10 and FIG. 11 show respectively the chip layout structure of another integrated logic/DRAM chip, specifically a Unified Media Memory (UMM) chip, made up of eight 8-Mb DRAM macros, gate array DRAM control logic, Bit Block Transfer (BitBLT) graphic processor, serial access memory(SAM) and supporting macros such as phase locked loop (PLL) and chip I/O drivers.

The various logic macros and supporting macros can be of different design type such as gate array, standard cell, custom design, analog circuits to implement the different logic functions of the integrated logic/DRAM chip. The layout compiler shown in FIG. 9 takes the different macro specifications as inputs and generates the layout of a chip.

This invention also describes a physical structure of integrated logic/DRAM chips which consist of a number of DRAM macros, a number of logic macros such as DRAM controller, computation macros (e.g., arithmetic logic unit or ALU), DRAM buffers, and some chip supporting macros such as phase lock loop for internal clock generation, built-in self-testing circuits, chip I/O drivers, and the like. The various logic macros and supporting macros can be of very different design style such as gate array, standard cell, custom design, analog macros.

The hardware description language (HDL) of a chip defines the functional, logical and timing specification of the various functional components in a chip in terms of the logic components, the storage components (DRAM, SRAM, caches, etc.) and other components such as analog (e.g. PLL (phase locked loop), macros, digital to analog converter (DAC), etc.) and I/O components. From the hardware description, each components are further subdivided, partitioned and implemented into their own optimized physical form. From the hierarchical hardware description, chip schematic, macro circuit schematic, the functionality and correctness of the chip is enforced by using a mixture of high level behavior, functional simulator, circuit simulator, as well as analog simulator for performance analysis of critical paths in circuits. The layout of each macro and the entire chips is checked against the corresponding schematic for layout correctness.

The DRAM components may be further subdivided and restructured into a number of DRAM macros in order to satisfy the requirements of capacity, form factor, I/O, banking, parallelism, etc., and they are usually implemented in the form of highly custom and optimized layout. Computational units such as fixed and floating point units, signal processing units are implemented in the form of bit-slice based data-path custom macros. The performance of these units is critical, and the circuits and transistors are designed to meet crucial timing requirements. Each control logic unit is usually synthesized by logic synthesis program as random logic macro, made up of gate-array or standard cells from a cell library for the underlying technology. A control unit supplies the various control, address, timing, and other signals to the other computation units and storage units for the functioning of the chip. The chip high level description, in general, contains a number of custom macros such as SRAM, (SRAM) caches, special purpose cores, analog circuits such PLL, DAC, etc.

The integrated logic/DRAM compiler consists of a number of programming modules and steps:

1. Functional Partitioning and DRAM macro customization and configuration—From the hardware description of the chip (i.e., HDL), the various functional units are partitioned into physically implementable blocks and signal interconnections between the blocks. This step customizes and configures the peripheral control circuits, column and row address decoders and drivers, and I/O circuits for a specific design. As shown in FIGS. 6 and 7, by combining different numbers of DRAM submacros (e.g., 1 Mb of DRAM submacro), and reconfiguring the address decoders/drivers of the DRAM macros, DRAM macros of different size can be obtained for specific applications. As shown in FIGS. 6 and 7, by customizing the I/O interface and driver circuits in the column structure of the DRAM macros, different I/O widths, e.g., X4, X8, X16, X64, can be obtained for specific applications. The driver interface between the logic macros and the DRAM macros are designed to minimize RC delay and slew for the DRAM address and control signals RAS, CAS, CE, among others. As shown in FIGS. 6 and 7, by customizing the peripheral control circuits of the DRAM macros, different mode of operation such as asynchronous vs. synchronous/pipeline can be selected for specific applications.

2. Macro placement and floor plan generation—From the hardware description of a chip (e.g., HDL), the various functional units are partitioned into physically implementable blocks and signal interconnections between the blocks. Based on this schematics which consists of the signal interconnection information of the functional blocks, the DRAM macros, the logic macros, and the various chip supporting macros are placed onto the different locations of the chip. The placement objective is to minimize some functions of the chip level interconnections, subject to physical constraints and requirements, such as size and form factor of the macros, input/output (I/O) pin location in the macros, and chip I/O drivers, power supply partitioning and noise isolation for logic and DRAM, DRAM macro distribution according to capacity and I/O width, layout of on-chip global buses and clocks. The entire chip is interconnected for each chip placement and the wiring space between the macros are adjusted to minimize overall chip area. The location of the I/O the dimensions of the macros, the dimensions of the wiring spaces in the chip are parameterized to enable the iterative executions of the the macro placement step and the chip level interconnect step to generate a chip floor plan that satisfies the constraints with smallest area.

3. Chip image generation—This step creates the overall physical layout structure for the DRAM macros, the logic macros, and the supporting macros. The logic macros are made up of gate array, standard cell, or by custom layout. DRAM macros have its own custom layout structure. Each of these logic and DRAM macros has its unique placement structure of logic and transistor devices, power distribution structure (e.g., VDD, GND), and interconnection requirements for the different level of metals.

4. Power distribution generation—The overall chip power distribution structure and grid are generated. The power distribution grid internal to the logic macros are also generated. The DRAM macros, logic macros and analog macros such as PLL are laid out in a way that their individual power distribution network can be supplied off-chip using separated power supplies. This arrangement minimizes the noise coupling between DRAM, logic and analog macros, and allows the independent testing of logic and DRAM components.

5. Chip level interconnection generation—The interconnection of all the DRAM, logic, chip supporting macros are generated according to the chip level netlist specification. The on-chip, high bandwidth data, address and control buses connecting the DRAM and the logic macros are wired in a way to minimize RC delay, and skew between the corresponding equivalent signal points, since these wires are usually long and span across the chip. This is done by (1) wiring the critical signal nets with wider than nominal metal width, (2)

balancing the wire length and topology from the source of the clock and control signals to the various controlling points (pins) of the various functional units, (3) adding balanced drivers along the wiring paths of the clock and control signals.

6. Logic macro generation using gate array, standard cell custom design
   (6a) This step performs the logic synthesis (from hardware description language to logic gate) of the various logic macros, followed by the mapping to technology dependent library books or custom circuits.
   (6b) It is then followed by the placement and wiring of the books or transistors, according to the underlying image requirement of gate-array, or standard cell, or custom-design.
   (6c) The clock tree and testing scan-chain are wired. The layout generated in this step has to meet the timing constraint requirements, pin location requirements and metal utilization requirements set forth from the higher level (chip level) design.
   (6d) Layout design rule checking, timing verification, logic simulation, layout to schematic checking, . . . have to performed also in this step to enhance design correctness.

Iteration of the above steps may be needed in order to meet the requirements, such as timing, physical dimensions, etc., imposed on the macro layout.

Figure 13:
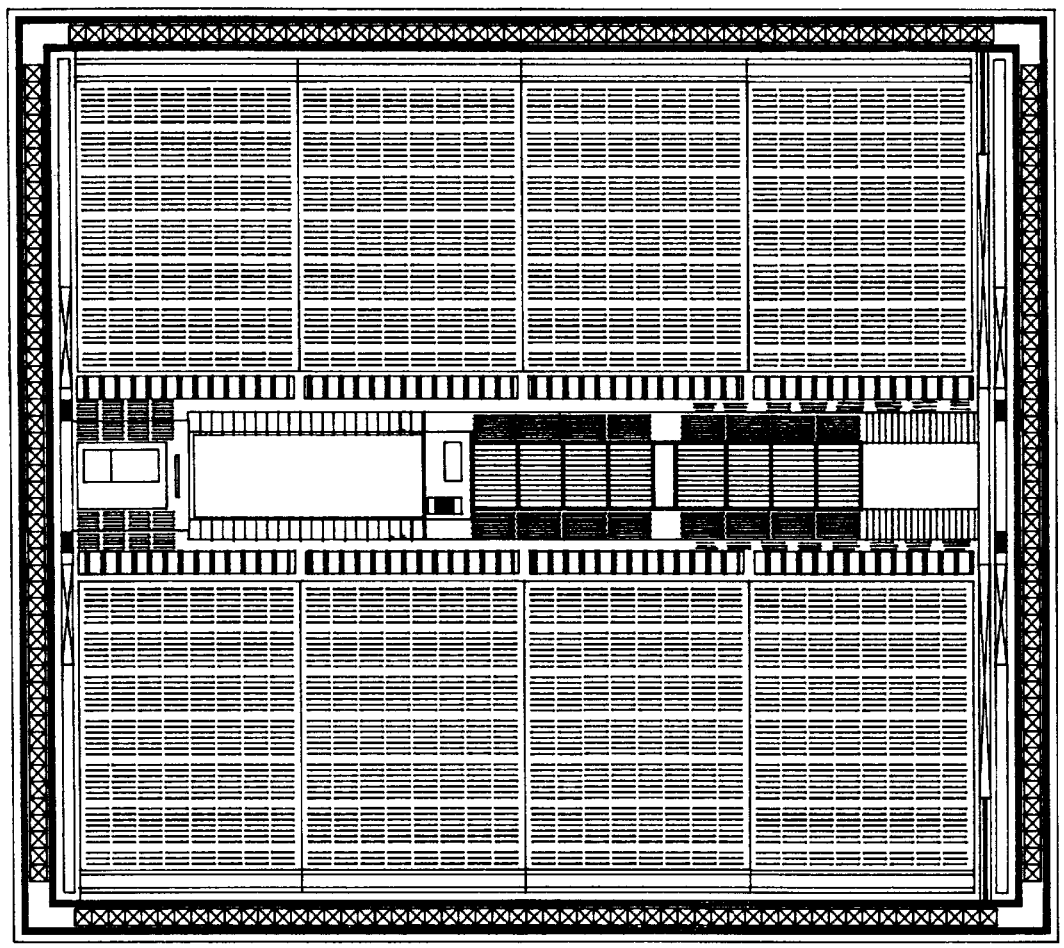
FIG. 13 is a microphotograph of the UMM chip layout.

7. Pin location, pin property, macro pin-to-pin timing—This information is abstracted from the layout for the chip assembly step that follows. FIG. 13 shows the layout of a logic macro obtained after layout synthesis, placement and wiring.

8. Chip layout generation
   (8a) After the layout of all the individual macros (DRAM, logic, supporting), based on the macro pin and timing information, the interconnections between all the macros (DRAM, logic, supporting) are wired. The clock interconnections and testing scan-chain are wired.
   (8b) DRAM decoupling elements are added to various places of the chip where necessary. Decoupling elements are added to the power supply buses of the logic and that of the DRAM separately.
   (8c) The entire chip is checked for design rule correctness and timing.

9. Iteration steps—If some of the chip design requirements are not satisfied, it is necessary to go back to redo the layout of some of the macros, and iterate through the macro layout and chip layout generation steps.

Figure 14:
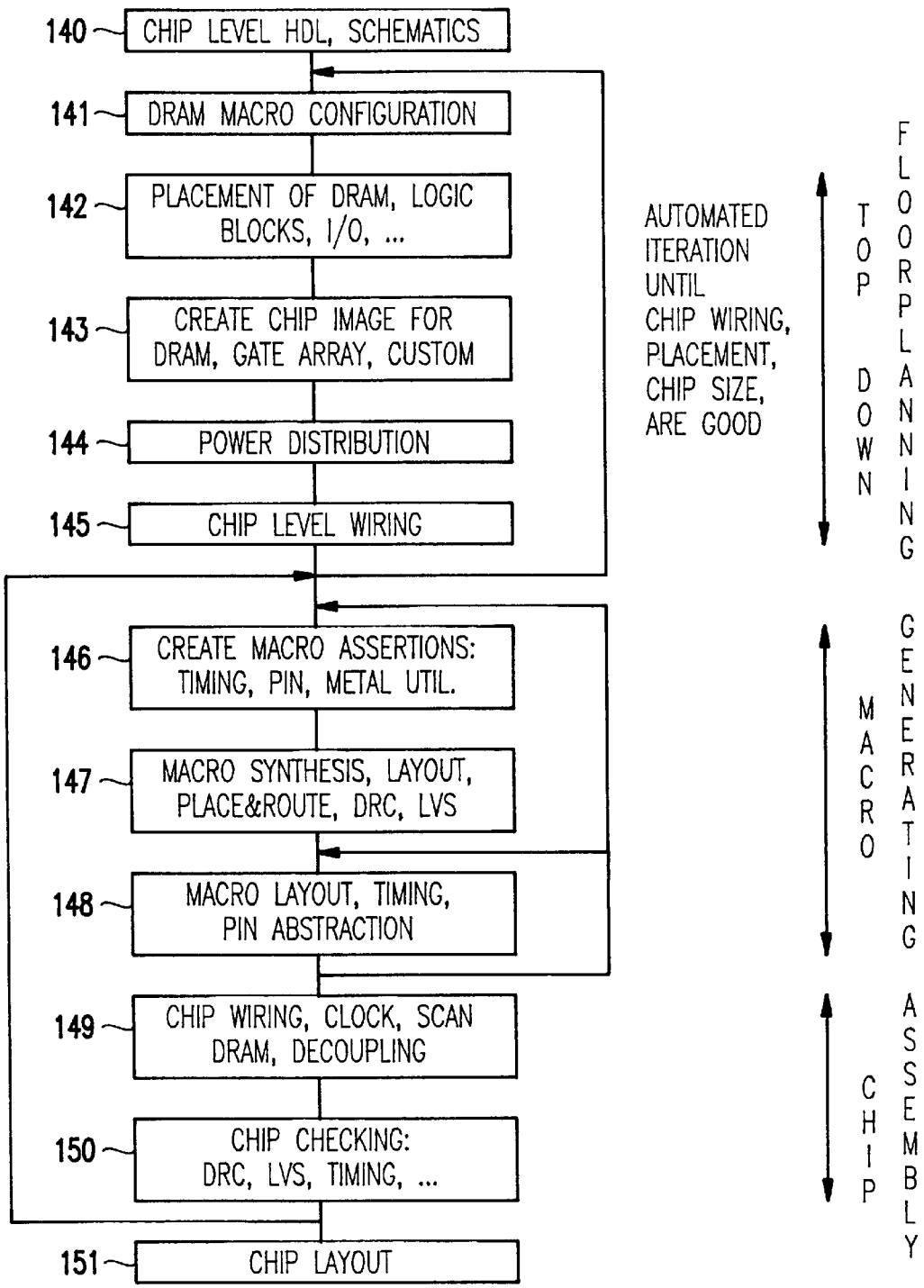
FIG. 14 is a flow diagram of the layout compilation of integrated logic/DRAM chips.

The overall flow-chart of the integrated logic/DRAM compiler is shown in FIG. 14. The DRAM compiler/configurator (block 141) configures the DRAM memory component and generates a number of DRAM macros. Information is extracted from chip level schematics in function block 140. The placement of DRAM, logic blocks, I/O and other structures is determined in function block 142. A chip image is created for DRAM, gate array, and custom circuitry in function block 143. Next, power distribution is determined in function block 144. In this step, an overall chip power distribution structure is generated for DRAM macros and logic macros as separate logic and DRAM power distribution networks (including the decoupling capacitor structure) in the interior of the chip. By separating the power distribution networks, the noise coupling between DRAM and logic macros through power supply buses is minimized. Achieving maximum noise immunity between the logic and DRAM components is key to the proper function of integrated logic/DRAM chips. In function block 145, chip level wiring is determined. In this step, on-chip logic interface circuits and on-chip metal interconnections between logic components and DRAM components are optimized to achieve maximum system bandwidth and system clock frequency. The steps 142 to 145 constitute the top down floor planning of the chip and are iterated until all chip wiring, placement, and chip size meet acceptable criteria.

Marco assertions, e.g., timing, pin placement, metalization, etc., are created in function block 146. Macro synthesis, layout, place and route tool function, DRC and LVS checking are done in function block 147. Then, in function block 148, macro layout, timing and pin abstraction are done in function block 149. Steps 146 to 148 constitute the macro generation which are again iterated.

Chip wiring, clock, scan and DRAM decoupling are performed in function block 149. Chip checking, DRC and LVS checking, timing, etc., are performed in function block 150. These two steps constitute the chip assembly portion of the method and, if necessary, the loops back to function block 146 to repeat the generation macro phase of the method until an acceptable chip assembly is generated. Finally, the chip layout is output in function block 151.

The following is an implementation example for a system on a chip. It is an integrated memory system on a silicon chip for multimedia application; specifically, a Unified Media Memory(UMM) chip. From the UMM hardware description and chip level block diagram/schematic (FIG. 12) as input, the input is transformed through a sequence of computer-aided design (CAD) steps to the complete chip layout.

FIGS. 10 and 11 show the implementation of global structure and FIG. 13 shows the layout of an integrated logic/DRAM chip for the Unified Media Memory (UMM) application which was designed in 0.25 micron CMOS technology with four layers of metal and device performance enhancement. The UMM chip consists of 64 Mb synchronous DRAM (SDRAM) arranged in eight 8 Mb SDRAM macros. The SDRAM macro supports a synchronous single-bank RAS control, and 1/2/4/8/full page burst modes, to operate at 200 MHz with an I/O width of 64 per macro. The eight SDRAM macros are arranged into two global memory banks for interleaving operation, supplying a wide I/O of 256 bits. The logic functions of the UMM integrated logic/DRAM chip consists of a 256-bit graphic processor (Bit Block Transfer or BitBLT) for manipulating graphic data to/from the SDRAM, a serial access memory (SAM) for exporting the graphic data stream off-chip, a gate-array control unit to generate the control/timing signals for the overall operations of all the macros of the chip, four multiplexer/buffers for high speed import/export of off-chip 64-bit data to the on-chip 256-bit data bus, a phase locked loop (PLL) for generating on-chip clock signals synchronized from an external clock. The macros are communicated through a high bandwidth on-chip 256-bit data bus operating at 133 MHz (200 MHz maximum), a SDRAM address bus, and various control buses such as RAS, CAS, WE, SDRAM enable, and so forth. In addition to the external 64-bit data pins, the chip has 32-bit memory address pins, 32-bit serial data output pins for graphic function, various mode control pins and test pins. it has an interface to the PowerPC™ microprocessor bus. The chip can be mounted onto a 240 pin package. The underlying structure of the gate-array random logic macro is also shown in FIG. 13. The DRAM macros perform basic memory function, the logic macros function together with the DRAM macros perform special functions determined by the overall architecture and logic design.

Figure 12:
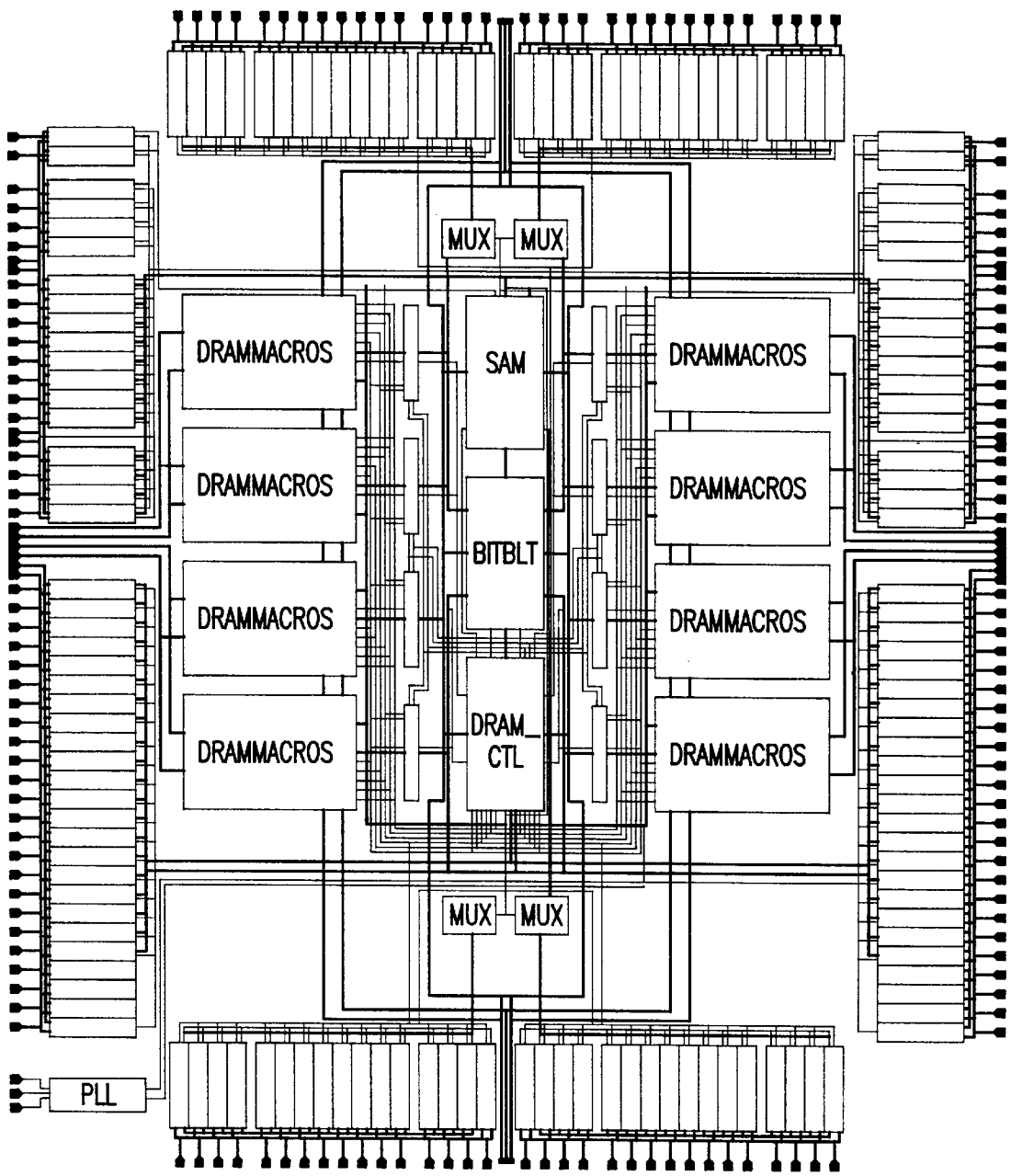
FIG. 12 is a schematic diagram of the UMM circuit.

FIG. 12 shows the UMM chip floor plan, including power buses, decoupling capacitor arrays, chip I/Os, DRAM and logic macro placement, chip level wiring. The chip structure includes eight 8-MB DRAM macros, a DRAM control logic macro (gate array), a BitBLT custom processor for DRAM data computation, a serial address memory (SAM), multiplexer, buffers for communication between on-chip buses and off-chip buses, and chip supporting circuits, PLL, I/O drivers and pads.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of compiling a layout of a system on a single integrated circuit chip, said system including a microprocessor core and system logic and dynamic random access memory (DRAM) organized in blocks, the method comprising the steps of:

extracting from a hardware description database information on various functional units and generating a macro placement and floor plan of the chip;
 configuring and compiling a DRAM memory component of the chip into DRAM macros;
 generating an overall physical layout structure for DRAM macros and logic macros;
 generating an overall chip power distribution structure and grid for DRAM macros and logic macros including power distribution grid internal to the logic macros;
 generating chip level interconnections of all DRAM, logic and chip supporting macros according to a chip level net list specification stored in a data base;
 implementing a global structure of the chip based on the generated overall physical layout structure, the generated overall chip power distribution structure and the generated chip level interconnections;
 generating logic macros using logic synthesis followed by placement and wiring of books of transistors according to the generated chip image;
 performing clock and timing verification, design rule checking and logic simulation to verify design correctness;
 generating a chip layout by wiring interconnections between all macros and adding decoupling elements and checking again for design rule correctness and timing; and
 outputting final chip layout for fabrication processing.

2. The computer implemented method recited in claim 1 wherein the step of configuring and compiling comprises the step of creating a physical structure, circuit and layout of embedded, growable DRAM macros with different amounts of memory capacity, banking and input/output (I/O) bandwidth, different addressing schemes, different modes of operation and time requirements as required for a specific application.

3. The computer implemented method recited in claim 1 wherein the step of generating an overall chip power distribution structure and grid for DRAM macros and logic macros comprises the step of separating logic and DRAM power distribution networks in the interior of the chip thereby minimizing noise coupling between DRAM and logic macros through power supply buses.

4. The computer implemented method recited in claim 1 further comprising the step of optimizing on-chip logic interface circuits and on-chip metal interconnections between logic components and DRAM components to achieve maximum system bandwidth and system clock frequency.

5. A computer based design system for compiling a layout of a system-on-chip design including a microprocessor core and system logic and dynamic random access memory (DRAM) organized in blocks, the design system comprising:

a source of system specifications for a DRAM memory subsystem, a microprocessor core, a cache, a system control bus, and input/output (I/O) for the system-on-chip design;
 a DRAM configurator receiving the specifications for the DRAM memory subsystem and generating an overall physical layout structure for DRAM macros including a power distribution network for the DRAM macros;
 a bus and interface synthesizer receiving the specifications for the system bus and I/O and synthesizing logic necessary to connect various logic and DRAM macros on the chip;
 a logic synthesizer receiving an output from the bus and interface synthesizer and the specifications for the microprocessor core and cache and generating logic macros and wiring of books of transistors according to a generated chip image including a power distribution network for the logic macros separate from the power distribution network for the DRAM macros to minimize noise coupling between DRAM and logic macros; and
 a chip integration function receiving outputs of the DRAM configurator, bus and interface synthesizer and logic synthesizer and generating a chip layout by wiring interconnections between all macros and adding decoupling elements, and a layout extraction function performing clock and timing verification, design rule checking and logic simulation to verify design correctness.

6. The computer based design system recited in claim 5 wherein the DRAM configurator creates a physical structure, circuit and layout of embedded, growable DRAM macros with different amounts of memory capacity, banking and input/output (I/O) bandwidth, different addressing schemes, different modes of operation and time requirements as required for a specific application.

7. The computer based design system recited in claim 5 wherein the chip integration function optimizes on-chip logic interface circuits and on-chip metal interconnections between logic components and DRAM components to achieve maximum system bandwidth and system clock frequency.

8. The computer based design system recited in claim 5 further comprising a database of circuit libraries accessed by the logic synthesizer.

9. The computer based design system recited in claim 8 wherein the source of system specifications includes analog subsystem specifications and further comprising a custom layout function receiving the analog subsystem specifications and outputs from the DRAM configurator and logic synthesizer and providing an output to the chip integration function to incorporate the analog subsystems on the chip.

10. The computer based design system recited in claim 8 wherein the source of system specifications includes a digital signal processor (DSP) specification and the custom layout specification further receives the DSP specification to incorporate the DSP on the chip.

11. The computer based design system recited in claim 5 further comprising a clock and timing analyzer providing inputs to the bus and interface synthesizer and the logic synthesizer.

* * * * *